United States Patent [19]

Saunders et al.

[11] 4,426,798
[45] Jan. 24, 1984

[54] TRANSPARENCY VIEWING DEVICE

[76] Inventors: Carter A. Saunders, 714 Highland Ave., Charlottesville, Va. 22903; Sherwood S. Brownlee, 905 Oak Ave. Ext., Waynesboro, Va. 22980

[21] Appl. No.: 249,601

[22] Filed: Apr. 8, 1981

[51] Int. Cl.³ .................................... G02B 27/02
[52] U.S. Cl. ................................... 40/361; 40/367
[58] Field of Search ............... 40/361, 362, 363, 364, 40/365, 366, 367

[56] References Cited

U.S. PATENT DOCUMENTS

| 2,298,754 | 10/1942 | Davis | 40/367 |
| 2,602,253 | 7/1952 | Diamond | 40/367 |
| 2,646,637 | 7/1953 | Nierenberg et al. | 40/361 |
| 3,200,523 | 8/1965 | Zagel | 40/367 |

FOREIGN PATENT DOCUMENTS

| 1112289 | 11/1955 | France | 40/367 |
| 1156364 | 12/1957 | France | 40/367 |

Primary Examiner—Gene Mancene
Assistant Examiner—David I. Tarnoff

[57] ABSTRACT

An illuminated transparency viewing device for viewing transparent loose-leaf pages and for sorting 35 mm slides. The device has a smooth viewing surface and a ribbed sorting surface on opposite sides of the device; wherein a double-sided reflector surface is hinged between the two sides so as to pivot from a first position, wherein light is reflected through the smooth viewing surface to a second position, wherein light is reflected through the ribbed sorting surface.

3 Claims, 6 Drawing Figures

TRANSPARENCY VIEWING DEVICE

SUMMARY OF THE INVENTION

This invention relates to equipment for the filing and viewing of photographic transparencies. It particularly relates to the combined use of a transparency loose-leaf file book (2) and the invention itself.

The prime objective of this invention is to provide an improved method for viewing transparencies which are filed or held in pockets of transparent pages (1) contained in a loose-leaf book (2) for storage.

The invention, when inserted between the transparent pages (1) that hold the transparencies to be viewed, provides artificial illumination for viewing of the transparencies without their removal from the pocket of the transparent page (1) and without the removal of the transparent page (1) from the loose-leaf book (2). This feature greatly speeds up the visual inspection of the transparencies.

The invention is of thin profile and, therefore, does not raise the page to be viewed beyond a good viewing angle for the operator.

Another object of this invention is to provide a sloped, back-lighted surface (3b) upon which 35 mm slides can be edited, sorted and viewed separately. This function is on the reverse side of the invention where ribs (7) are provided for the correct positioning of the slides. (Slides are 2"×2" mounted)

The invention is very light-weight, portable and small enough to carry from place to place easily. It is used or held in one hand (either left or right) when functioning with the transparency loose-leaf book. (2)

This invention is not confined to any particular construction or material, it being understood that a variety of materials and production methods can be used to manufacture a device that would perform the same function in the same manner as described in the preceding paragraphs.

IDENTIFICATION OF NUMBERED PARTS ON DRAWINGS FIG. 1 THRU FIG. 6

Figure 1:
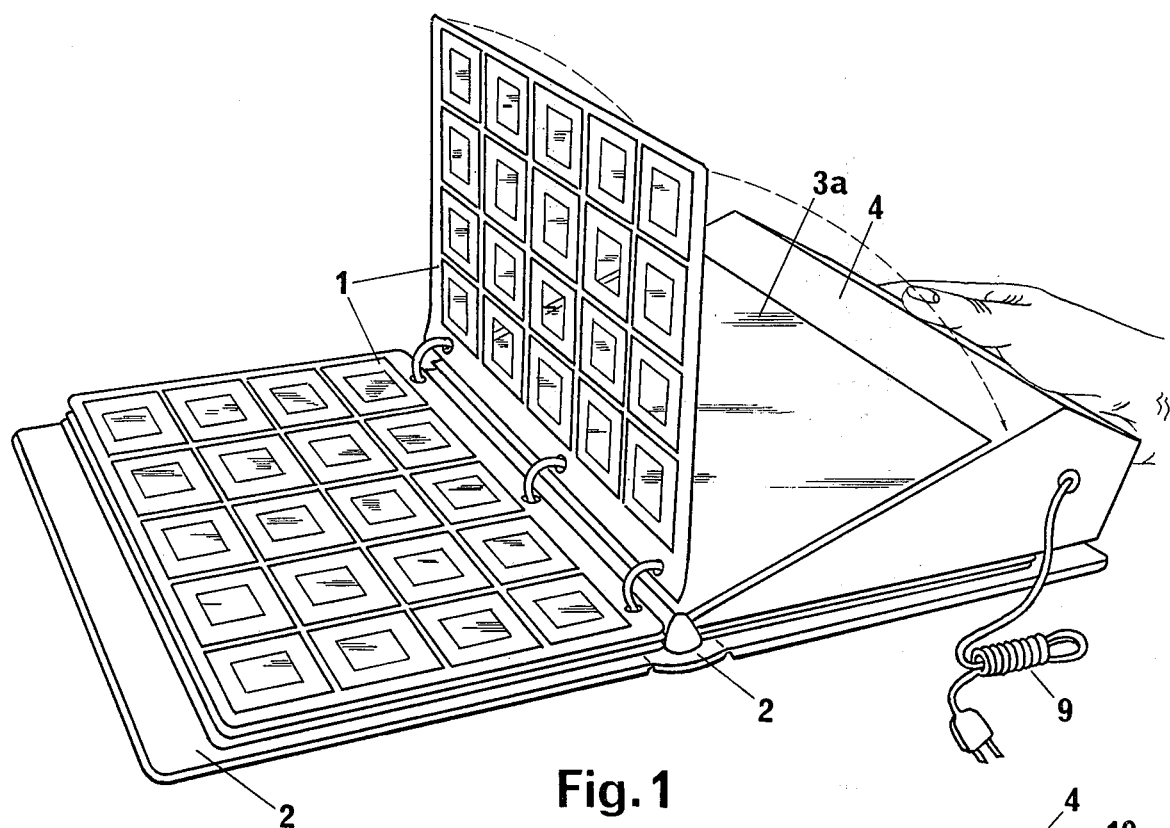
FIG. 1 is a perspective view showing the unit as used in conjunction with a transparency loose-leaf storage book. (2)
Figure 2:
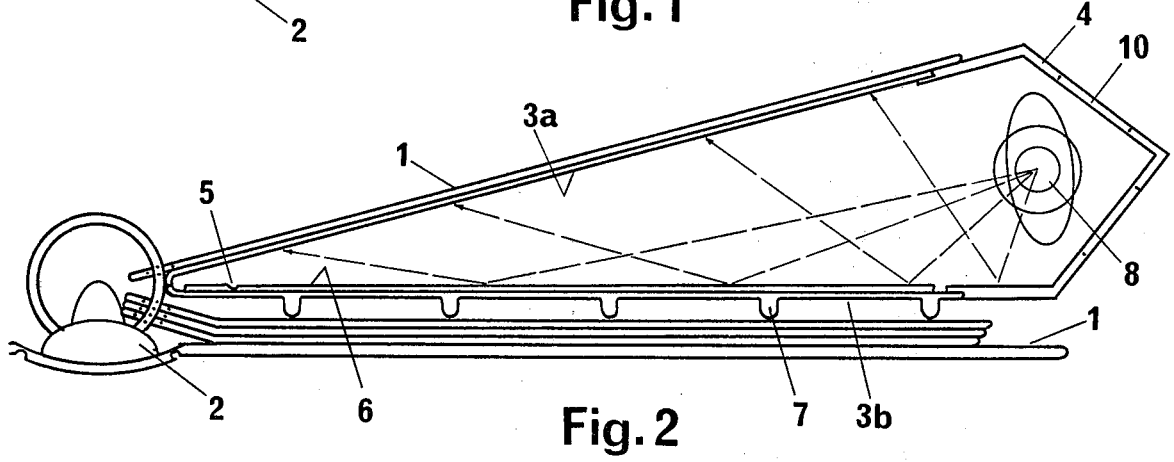
FIG. 2 is a sectional view showing the profile of the invention and its construction details.
Figure 3:
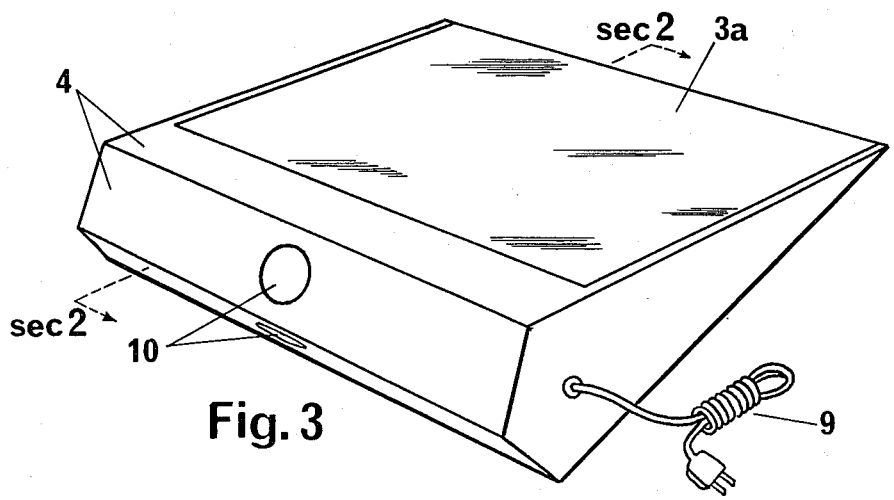
FIG. 3 is a perspective view showing the hand-held side of the invention.
Figure 4:
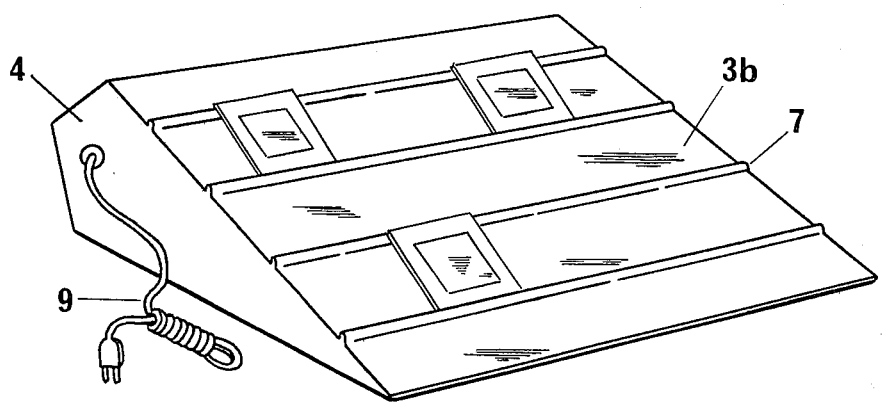
FIG. 4 is a perspective view showing the reverse side of the invention which is used for 35 mm slide sorting and viewing.
Figure 5:
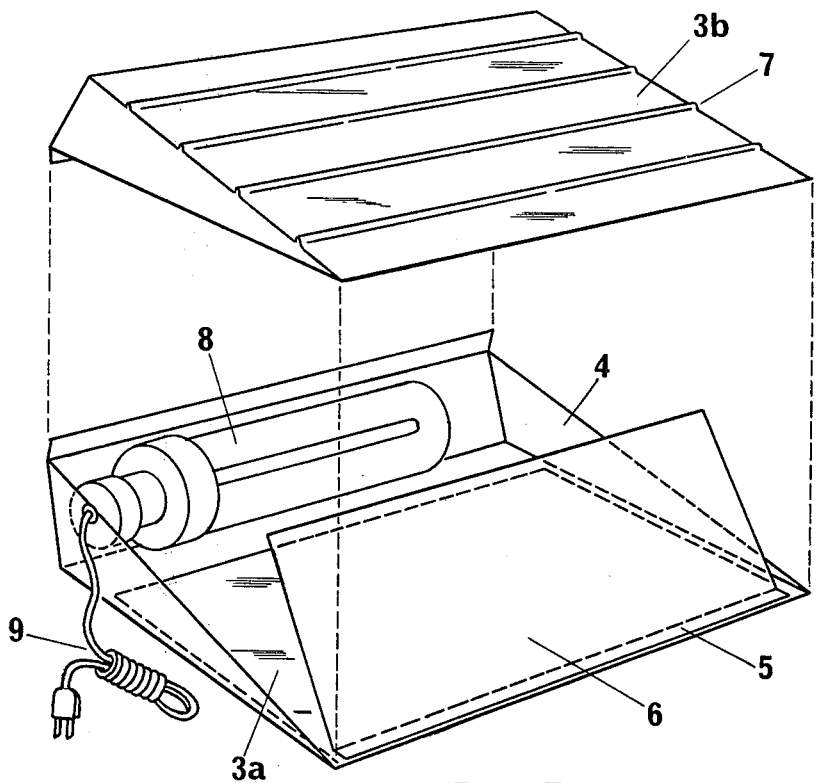
FIG. 5 is an exploded view showing the various functional parts that make up the invention.
Figure 6:
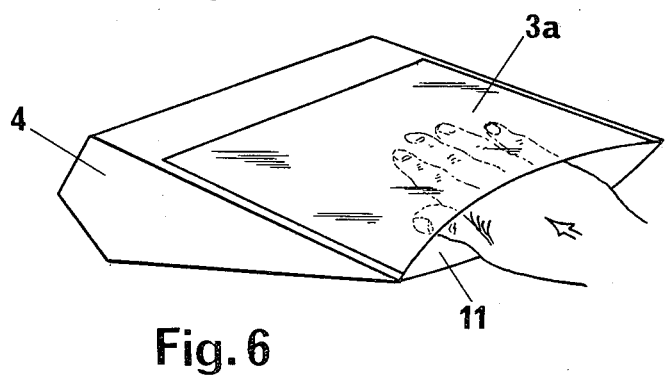
FIG. 6 is a perspective view that shows how the unit is opened for light bulb replacement.

1. Transparent loose-leaf pages for holding transparencies such as 35 mm slides, film positives, film negatives and transparencies.
2. Loose-leaf storage book for holding transparent pages (1).
3a. Smooth translucent, backlighted viewing surface.
3b. Ribbed translucent, backlighted viewing surface.
4. Opaque housing of the device.
5. Hinge for double-sided reflector surface.
6. Double-sided reflector surface.
7. Horizontal, raised rib for positionging 35 mm slides on viewing surface.
8. Light source.
9. Electrical power source—110 volts AC or battery power DC.
10. Finger holes for hand holding-ventilator holes.
11. Access opening for replacement of light bulb.

DESCRIPTION OF THE PREFERRED EMBODIMENT

1. To view transparencies that are stored in the transparent pages (1) of a loose-leaf book (2)—turn on the invention by plugging into the electrical power source (9); open the front cover of the loose-leaf book; lift a transparent page (1) with one hand while, with the other hand, slipping the invention underneath and aligned with that raised transparent page (1); drop the transparent page (1) down upon the smooth, translucent surface (3a) of the invention. Now the transparencies (1) are back-illuminated for viewing. To proceed to another page, pull the invention from the book pages (1), lift another page (1) and insert the invention underneath this page (1). Repeat this process as rapidly as desired. Viewing in the book (2) may be done from front to back, back to front or at random.

2. To sort 35 mm slides with this invention, it is necessary only to turn the face of the unit with the 5 horizontal ribs (7) upward and place the slides against the lighted translucent surface (3b) with one of the ribs (7) holding the bottom edge of the slide frames.

This invention comprises the features hereinafter fully described and particularly pointed out in the claims that follow.

We claim:

1. An apparatus for viewing pages of transparencies in a loose-leaf book and for sorting individual transparencies, comprising:

a housing which is generally wedge shaped in cross section, said housing have three sides and a top and bottom translucent viewing surface, said top surface being generally smooth for viewing said pages containing at least one of said transparencies, said bottom surface having spaced transverse ribs extending between two of said sides for permitting mounting, viewing and sorting of said individual transparencies;

a hinged double sided reflector surface which is mounted on said housing where said top and bottom surfaces meet for pivotal movement between said surfaces; an internal light source for illuminating said top and bottom viewing surfaces; said apparatus being adaptable for use in a first position in which said smooth surface is inserted under a said page of transparencies for viewing, and a second position in which the ribbed surface faces up for viewing, sorting and mounting said individual transparencies, whereby said reflector surface pivots between the top and bottom surfaces as the apparatus is moved between said first and second positions.

2. An apparatus as in claim 1 further comprising finger holes in said housing for carrying said apparatus.

3. An apparatus as in claim 1 or 2 further comprising said translucent viewing surfaces which are flexible so that said surfaces may be flexed for the replacement of said light source.

* * * * *